May 21, 1957 J. N. MOECKEL 2,792,851
BLANKET CLOTH AND METHOD OF MAKING THE SAME
Filed Oct. 27, 1955 9 Sheets-Sheet 1

Inventor
John N. Moeckel
by Roberts Cushman & Grover
Att'ys

May 21, 1957 J. N. MOECKEL 2,792,851
BLANKET CLOTH AND METHOD OF MAKING THE SAME
Filed Oct. 27, 1955 9 Sheets-Sheet 2

Inventor
John N. Moeckel
by Roberts Cushman & Grace
Attys

May 21, 1957          J. N. MOECKEL          2,792,851
BLANKET CLOTH AND METHOD OF MAKING THE SAME
Filed Oct. 27, 1955.          9 Sheets—Sheet 3

Inventor
John N. Moeckel
by Roberts Cushman & Crowe
Att'ys

May 21, 1957 J. N. MOECKEL 2,792,851
BLANKET CLOTH AND METHOD OF MAKING THE SAME
Filed Oct. 27, 1955 9 Sheets-Sheet 4

Inventor
John N. Moeckel
by Roberts Cushman Grover
Att'ys

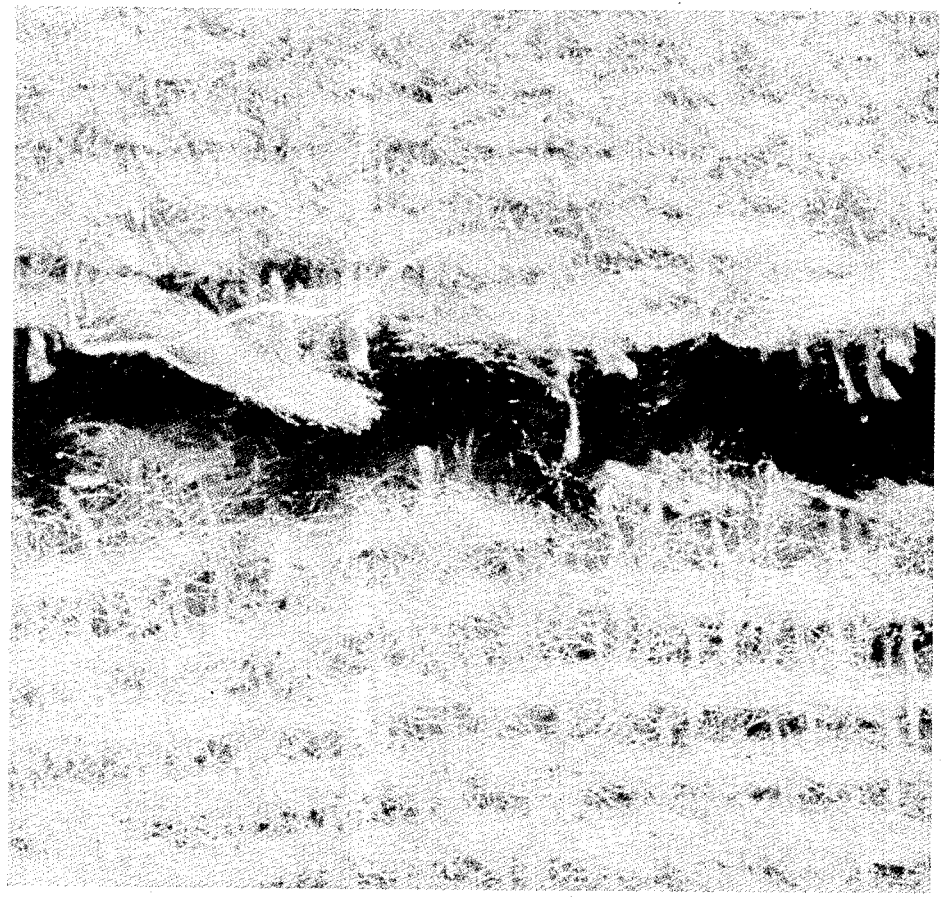

Inventor
John N. Moeckel

May 21, 1957  J. N. MOECKEL  2,792,851
BLANKET CLOTH AND METHOD OF MAKING THE SAME
Filed Oct. 27, 1955  9 Sheets-Sheet 7

Inventor
John N. Moeckel
by Roberts Cushman & Grover
Att'ys

May 21, 1957 J. N. MOECKEL 2,792,851
BLANKET CLOTH AND METHOD OF MAKING THE SAME
Filed Oct. 27, 1955 9 Sheets-Sheet 8

Inventor
John N. Moeckel
by Roberts Cushman & Grimes
Att'ys

Inventor
John N. Moeckel
by Roberts Cushman Green
Att'ys

UNITED STATES PATENT OFFICE 2,792,851
Patented May 21, 1957

2,792,851

BLANKET CLOTH AND METHOD OF MAKING THE SAME

John N. Moeckel, Saco, Maine, assignor to Pepperell Manufacturing Company, Boston, Mass., a corporation of Massachusetts Application October 27, 1955, Serial No. 543,089

11 Claims. (Cl. 139—383)

This invention pertains to woven textile fabric, more especially to a fabric such as is employed in the manufacture of bed blankets or the like, and to a method of making it, the present application being a continuation-in-part of application for Letters Patent of the United States Serial No. 484,344, filed January 27, 1955. In accordance with customary practice in the manufacture of such blankets, a base fabric or blanket cloth is first woven, usually comprising warp yarns of relatively small diameter, quite commonly of hard twisted cotton, and relatively coarse soft-twisted filling yarns or wefts, for example of cotton, wool, synthetic fiber, or mixtures of various textile materials. While a plain weave may be employed, it is usual to employ a simple twill weave; one fabric customarily employed being an even-sided 3—1 twill double weave cloth, in which by reason of the great excess of soft filling as compared with the fine warp yarns, the face of the material, as woven, consists predominantly of the filling yarn, each pick extending in a substantially straight line and always remaining at the same face of the fabric where it is exposed between adjacent warps. The yarns constituting each successive pair of wefts are disposed at opposite faces of the fabric, and are usually substantially directly behind one another. This base fabric is quite loose in texture, so that if viewed through a magnifying lens, successive pairs of picks of filling are seen to be spaced apart.

After this base fabric has been prepared it is subjected to a napping operation, wherein its surface is brought into contact with a rotating drum covered with card clothing or the like, the effect of which is to lift fibers from the exposed surface of the filling yarns and thus raise the soft, lofty nap which is characteristic of a blanket.

Blankets made in accordance with the above practice tend to shrink to a much greater degree longitudinally or warp-wise than width-wise during laundering, for example from 9% to 10% of the length during a first standard laundry treatment, but only about 2½% in width. It is believed that this excess warp-wise shrinkage is due to the initial spacing of the wefts, which permits unobstructed shrinkage of the warps until the wefts have been drawn so firmly together as to prevent further decrease in the length of the fabric. It may be noted at this point that because of competitive conditions in the blanket trade it is not admissible to increase the density of blanket cloth, such as made according to usual methods, sufficiently to reduce warp-wise shrinkage to any substantial degree, and even if cost conditions made it feasible to increase the density enough for that purpose, such a procedure would be precluded because the resultant fabric would not be amenable to the normal napping operation.

During the napping operation, wherein fibers are lifted from the filling yarns to form the nap, a substantial amount of fibrous material is actually torn loose from the yarn and is carried away by the napping drum. This material, known as "napper flocks," may constitute as much as 9% of the original weight of the fabric. Thus, in order to produce a blanket of a given, finished weight, the blanket cloth or base fabric must be woven of excess weight in order to compensate for the loss in the napping operation. Since this loss in weight is in material already processed into yarn, the actual loss from the cost standpoint is very material.

Moreover, additional fibers, not picked up by the napping drum, remain loosely entangled with the permanent nap fibers, and during use gradually separate from the blanket, a characteristic referred to as "shedding," which if in any substantial amount is obviously very undesirable.

Among the objects of the present invention is to provide a blanket cloth such that, as compared with usual blanket cloths, a lesser weight of yarn need be employed in weaving it while producing a blanket of equal weight and quality. A further object is to provide a blanket cloth which, although no greater in weight than the usual blanket cloth above referred to, has a closer surface texture and is much more resistant to warp-wise shrinkage than the usual blanket material, for example, such that it will not shrink more than approximately 4% in length during the first standard laundry treatment. A further object is to provide a blanket cloth which, when subjected to the customary napping operation, loses substantially less in weight than is true of the usual blanket cloth, for instance, to provide a cloth which will not show a loss in napper flocks of more than approximately 5% of the weight of the original material, and further to provide a blanket cloth which, after being napped, shows substantially less tendency to shed fiber during use than blankets made according to customary procedures.

A further object is to provide a blanket cloth which, after being napped, possesses a better "cover" than is true of most prior blanket cloths. In this connection the term cover refers to the effectiveness with which the nap conceals the base fabric construction. A further object is to provide a blanket cloth which, after being napped, shows better wearing qualities than most prior blanket cloths, and also to provide a blanket which is warmer than customary blankets of the same weight and material. Other and further objects and advantages of the invention will be pointed out in the following more detailed description and by reference to the accompanying drawings, wherein Fig. 1 is a view showing a piece of blanket cloth made according to the present invention, but greatly magnified;

Figure 1:
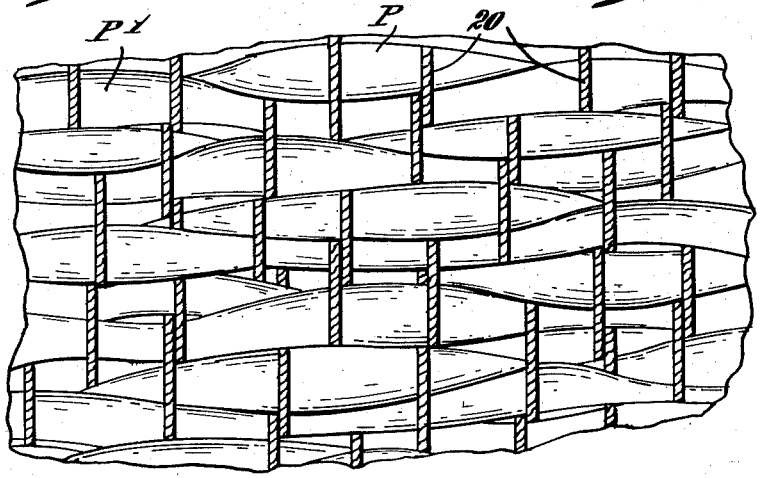
Figure 4:
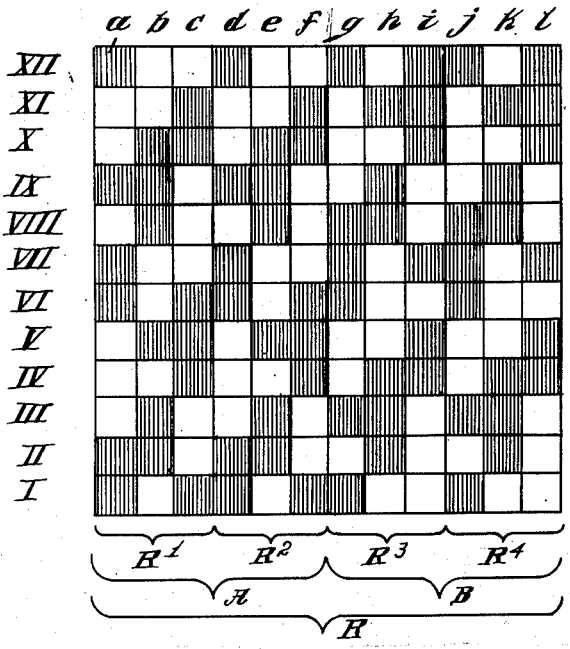
Fig. 4 is a weave diagram illustrating a preferred embodiment of the invention wherein twelve warp ends and twelve picks of weft form a complete pattern repeat.
Figure 7:
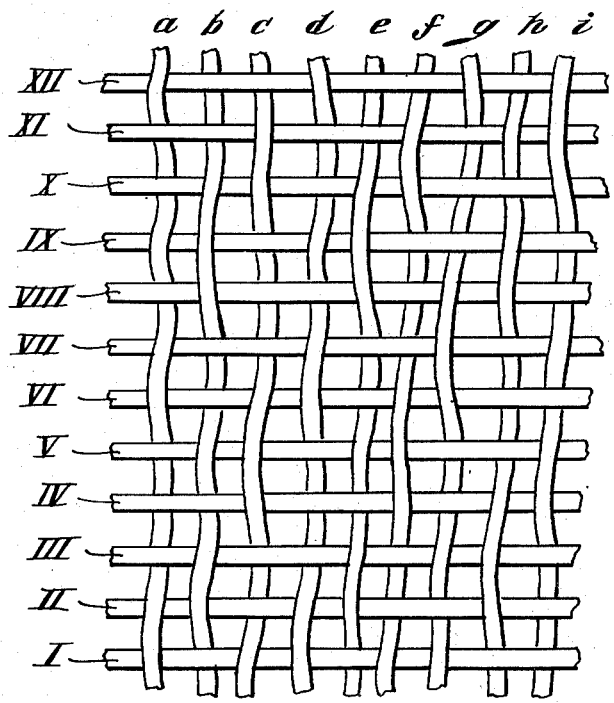
Figures 8A, 8B, 8C, 8D, 8E, 8F:
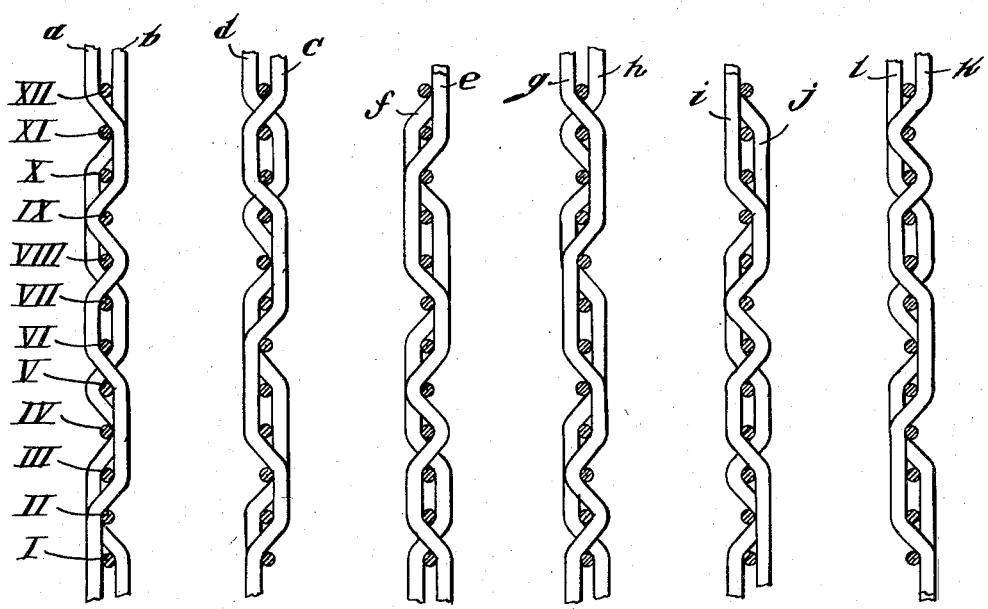
Figure 9:
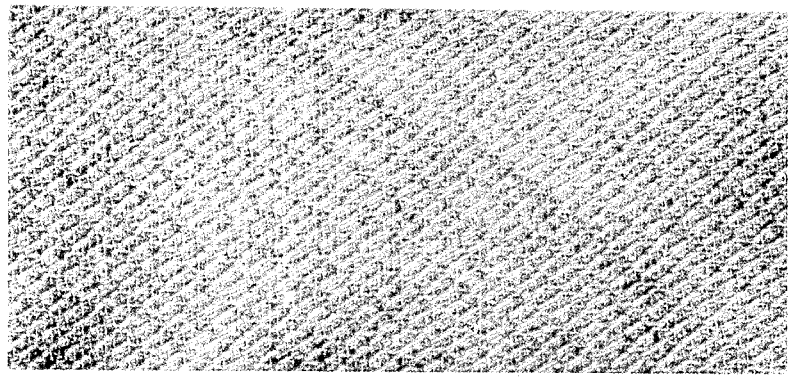
Figure 10:
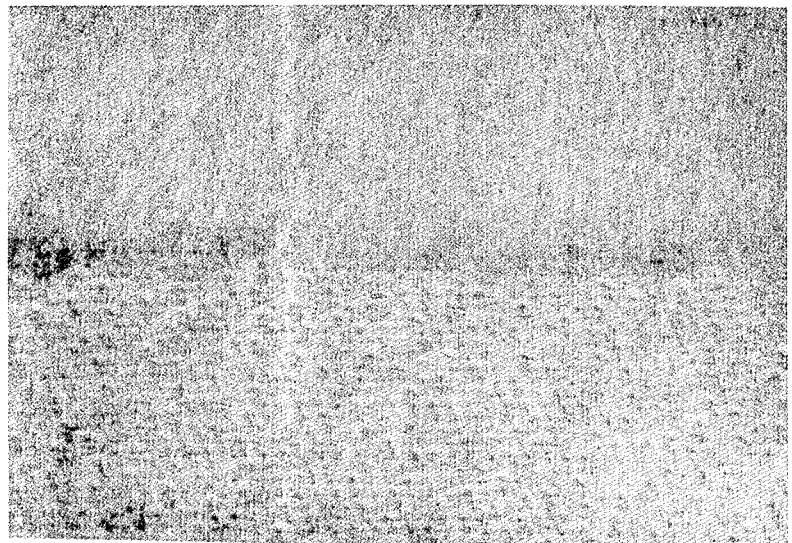
Figure 16:
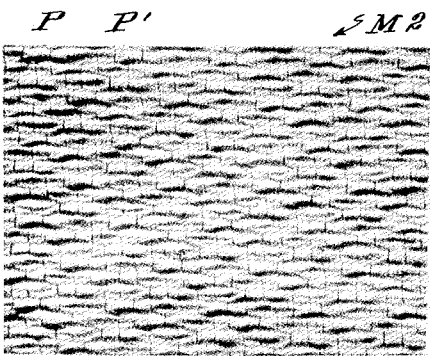
Figure 17:
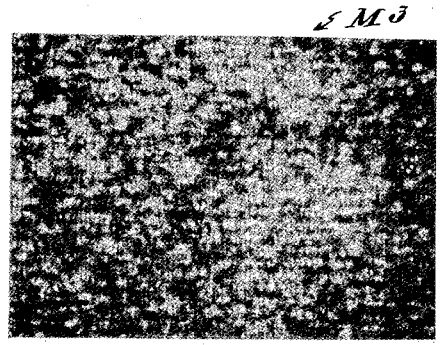
Figure 18:
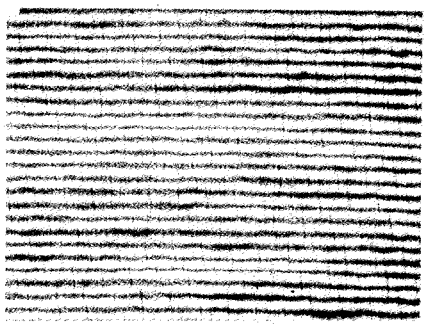
Figure 19:
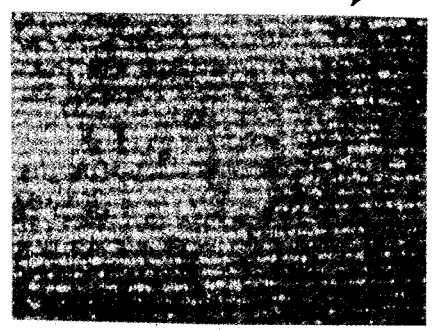
Figure 20:
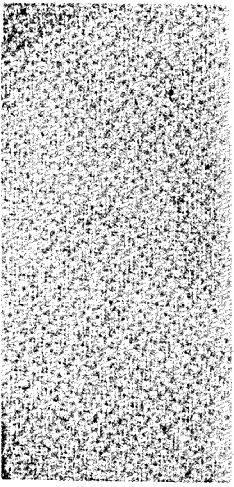
Figure 21:
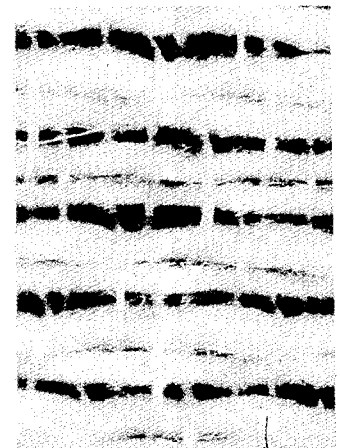
Figure 22:
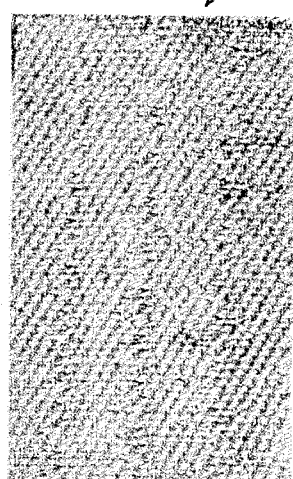
Figure 24:
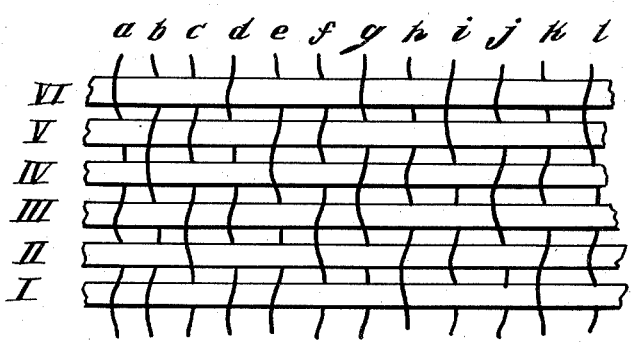
Figures 25A, 25B, 25C, 25D, 25E, 25F:
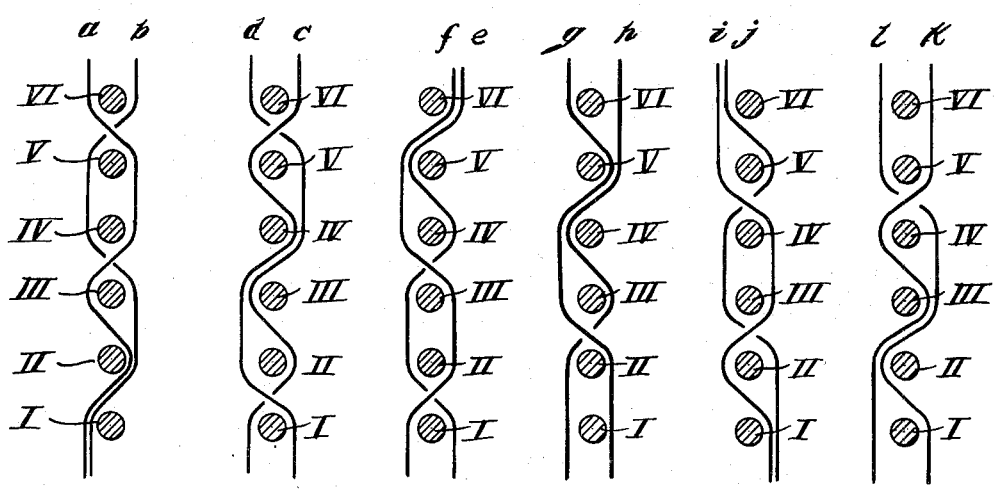
Figure 23:
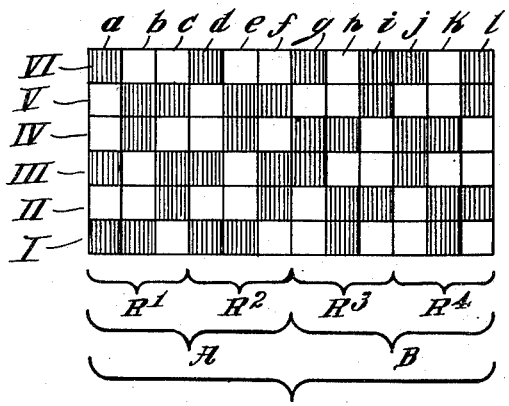
Figure 26:
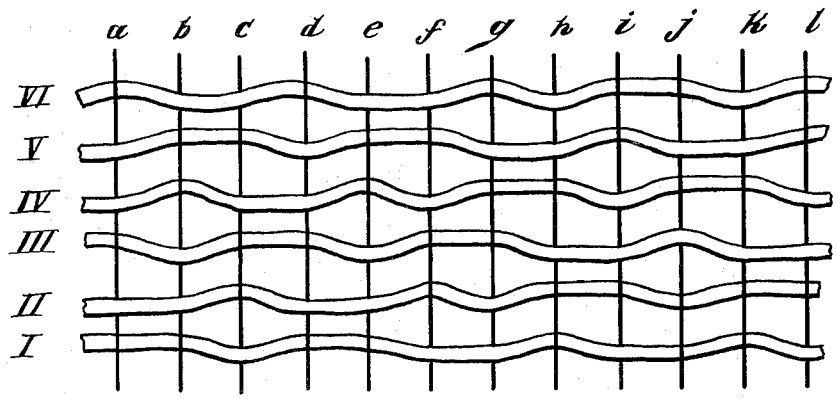
Figure 27A:
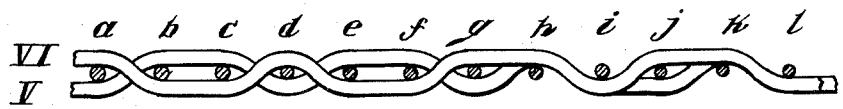
Figure 27B:
Figure 27C:
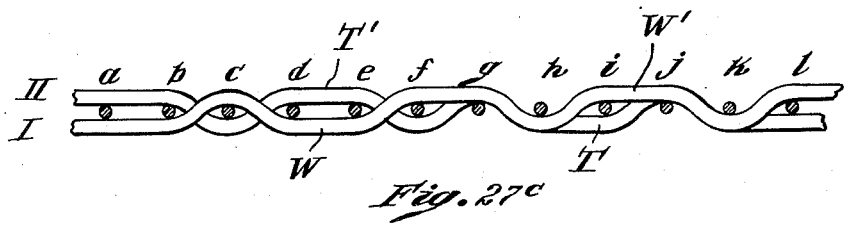
Figure 28:
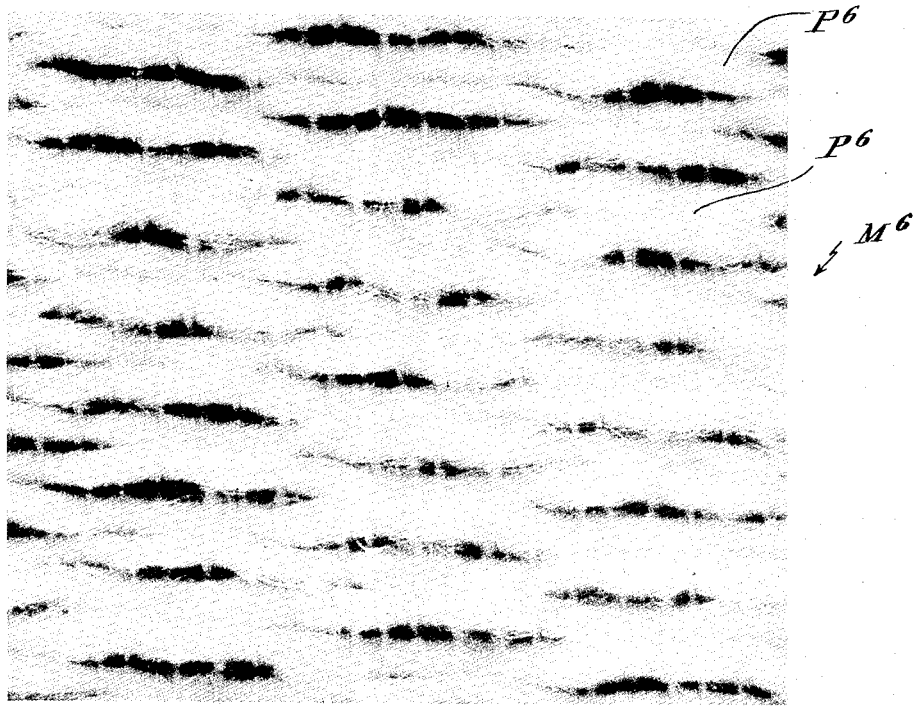
Figure 29:
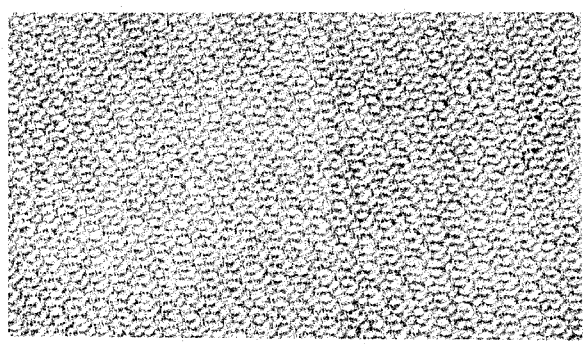
Figure 30:
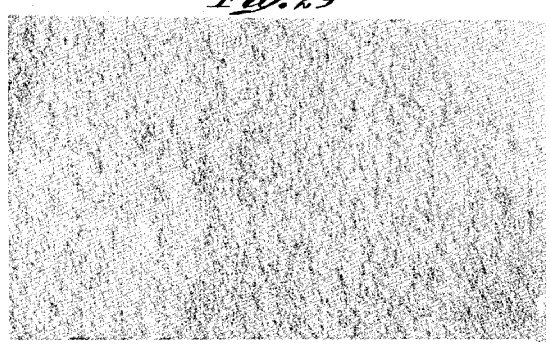

Figs. 6ª to 6ᶠ are transverse sections, showing the arrangement of the front and rear filling picks of each of the six successive pairs of picks comprised in a pattern repeat;

Fig. 7 is a chart showing the warp interlacing;

Figs. 8ª to 8ᶠ are longitudinal sections showing the arrangement of the warps comprised in a pattern repeat;

Fig. 9 is a photolithographic reproduction of a piece of actual blanket cloth prior to napping, embodying the invention of Fig. 1;

Fig. 10 is a photolithographic reproduction of a piece of blanket cloth like that of Fig. 9 after it has been napped, the upper portion of this view showing the napped portion of the material, while the lower portion of the same view shows the fabric as it appears with the nap sheared off, illustrating the close structure of the base fabric even after napping;

Fig. 11 is a photolithographic reproduction of two photo-micrographs arranged in juxtaposition, the upper portion of this view illustrating a piece of napped blanket cloth embodying the present invention, while the lower portion of the same view illustrates a piece of napped blanket cloth made according to conventional practice;

Fig. 12 is a photolithographic reproduction showing one face of a piece of fabric woven according to customary procedure in the weaving of blanket cloth but using, as wefts, picks of braided cord, two picks of black cord alternating with two picks of white cord;

Fig. 13 is a view similar to Fig. 12, but showing the reverse face of the same fabric;

Fig. 14 is a view similar to Fig. 12, showing one face of a piece of fabric in which usual warps and braided-cord wefts are interwoven according to the present invention;

Fig. 15 is a view showing the reverse face of the fabric of Fig. 14;

Fig. 16 is a photolithographic reproduction of an enlarged photograph of a piece of the actual fabric of Fig. 1 showing the surface configuration in greater detail than Fig. 9;

Fig. 17 is a photolithographic reproduction of an enlarged photograph of a piece of the actual fabric of Fig. 1 after it has been napped, and when viewed against an illuminated background;

Fig. 18 is a view similar to Fig. 16, but showing blanket fabric of conventional weave structure;

Fig. 19 is a view similar to Fig. 17, but showing the fabric of Fig. 18 after it has ben napped;

Fig. 20 is a photolithographic reproduction of a piece of fabric woven with but a single sub-repeat in each complete pattern repeat, and employing twelve picks of weft for each complete repeat;

Fig. 21 is a photolithographic reproduction of a photo-micrograph of the fabric of Fig. 20, illustrating its very loose texture;

Fig. 22 is a view similar to Fig. 20, but showing fabric woven with six sub-repeats in each complete pattern repeat and with twelve picks of weft in each pattern repeat;

Fig. 23 is a weave diagram similar to Fig. 4, but showing an arrangement in which there are but six picks of weft in each complete pattern repeat;

Fig. 24 is a chart showing the filling interlacings according to the weave diagram of Fig. 23;

Figs. 25ᵃ to 25ᶠ inclusive are transverse sections showing the arrangement of the front and rear filling picks of a pattern repeat;

Fig. 26 is a chart showing the warp interlacing;

Figs. 27ᵃ, 27ᵇ and 27ᶜ are longitudinal sections showing the arrangement of the warps comprised in a single pattern repeat;

Fig. 28 is a photolithographic reproduction of a photo-micrograph of a piece of fabric made according to the weave diagram of Fig. 23;

Fig. 29 is a photolithographic reproduction of a piece of fabric woven according to the diagram of Fig. 23, and Fig. 30 is a photolithographic reproduction of a piece of fabric like that of Fig. 29 after it has been napped.

The present invention is based upon the discovery that by weaving a double fabric according to a certain novel weave pattern while employing relatively fine warps and relatively coarse soft twisted wefts each face of the fabric exhibits recurrent transversely elongate puffs formed by weft floats, the individual wefts of a pair appearing first at one face and then at the other of the fabric, and the axes of the picks of a pair being located in planes inclined to the face of the fabric, the planes of the axes of successive pairs sloping in opposite directions. Apparently one pick of weft partially rolls over the other at recurrent points, whereby the effective thickness warp-wise of adjacent picks is increased at certain points. The exact reason for this rolling of one pick over the other is not fully understood, but it is observed that as a result of this action the total effective space between the several pairs of wefts is substantially decreased, as compared with the total space between constituent pairs of wefts of blanket cloth woven according to customary practice. The result is that the fabric made in accordance with the present invention resists warp-wise shrinkage without requiring the addition of material to accomplish this result.

In the fabric which results from the practice of the present invention these elongate puffs of a given filling pick appear recurrently first at one face and then at the other of the fabric. By reason of this construction, the filling yarns are injured to a much lesser degree during napping than is the case when, as in usual double weave blanket cloth, the filling is exposed uninterruptedly across the entire width of the fabric. According to the present method, wherein the length of the fiber staple is substantially greater than the length of one of these puffs, the wire teeth of the napping roll preferentially engage these puffs and raise the nap therefrom, and since at the narrow ends of each puff the fibers are firmly bound in, where the filling squeezes through to the opposite side of the fabric, the napping wires cannot tear fibers entirely loose to any such degree as when the usual blanket cloth is being napped.

Because of the fact that portions of the wefts of a pair are thus exposed, first at one side and then at the other of the fabric, the nap at each side of the blanket comprises fibers originating in wefts which are predominantly at the opposite side of the fabric, the result being that the nap is much more firmly anchored in place than in blankets made according to customary practice; less shedding occurs in the finished blanket, and the blanket has a superior cover effect. It has been shown experimentally that if the warps are all pulled out of a piece of the napped fabric made in accordance with the present invention, the blanket still remains as an integral structure because of the interlocking of the nap forming fibers throughout the thickness of the blanket, whereas when the same experiment is performed with a napped blanket of usual construction, the two sides of the blanket are so loosely joined as substantially to fall apart.

Referring to Figs. 2, 3, 14 and 15, the material M there shown to illustrate the theoretical weave structure is comprised of fine warp yarns 20 and two sets of filling, the strands which form the filling being of soft braided cord of very large size as compared with the weft yarns actually used in making the blanket cloth. The material illustrated in Figs. 2, 3, 14 and 15 is woven under heavy tension in order that the wefts may be constrained to take exact positions as determined by the weave pattern, but it is to be understood that this material M is merely shown to illustrate the theory and because the exaggerated size of the filling in this tightly woven fabric makes it possible more easily to trace the course of each filling yarn.

Figures 2, 3:
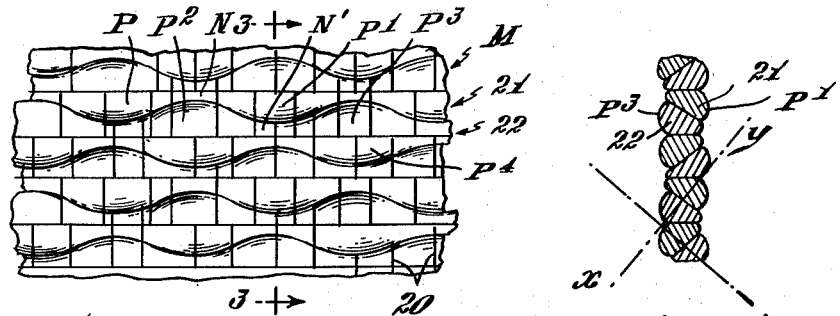
Fig. 2 is a view showing a piece of material woven in accordance with the method of the present invention, but employing an excessively large weft consisting of soft braided cord thereby to show as clearly as possible the theoretical weave structure.
Fig. 3 is a section on the line 3—3 of Fig. 2, omitting the warp yarns and indicating diagrammatically the apparent arrangement of the wefts of successive pairs.

In the fabric of Figs. 2 and 3, successive puffs P and P' of a weft 21 of a pair taper down to a narrow connecting neck N at which point the weft 21 appears as a puff at the opposite face of the fabric. In the same way, successive puffs P² and P³ of the companion weft 22 of the pair taper down to the connecting neck N', which, it will be noted, registers with the puff P' of the weft 21, the weft 22 appearing as a puff at the opposite side of the fabric at the location of this neck N'.

Apparently, as indicated in Fig. 3, at any selected longitudinal section through the fabric the axes or central points of the wefts 21 and 22 of one pair are disposed in a plane X—Y which is inclined to the face of the fabric, while the axes or central points of the wefts constituting the next pair, lie in a plane which inclines oppositely to the plane X—Y. It will of course be understood that in material of this nature the inclinations of these planes may vary substantially and unpredictably, and it is not to be expected that the above relations will approach anything like mathematical accuracy. However, it is evident that, in the fabric of Fig. 2, at recurrent intervals, puffs P³ of one yarn contact puffs P⁴ of the next adjacent yarn thus apparently, in effect, forming abutments which resist shrinkage of the warps in laundering. To facilitate comparison of the structure of the novel fabric of the present invention with conventional blanket cloth, the fabric N (Figs. 12 and 13) was woven according to customary weave practice but using fine warp yarns and heavy filling of soft braided cord such as was used in making the fabric of Figs. 2, 3, 14 and 15. Inspection of Figs. 12 and 13 (which show opposite faces, respectively, of the fabric N) clearly shows that the fabric lacks anything corresponding to the puffs P, P¹, etc. of the fabric of Figs. 2, 3, 14 and 15, the wefts of the fabric N extending substantially straight, and without deviation, transversely of the material.

In the actual blanket cloth the size and character of the warp and filling yarns will vary according to the grade and weight of the blanket to be made. Merely by way of example but without limitation, good results in blanket manufacture may be obtained according to the present invention when using as warps 21.75 singles, cotton yarn in a 33 sley; and 2½ cotton-count filling of mixed staple rayon and nylon (1½" to 3" staple) with from 22 to 35 picks per inch.

The unusual closeness of this new weave, in the longitudinal direction, as compared with conventional practice is illustrated in Figs. 16 to 19 inclusive. In Fig. 16 the surface texture of an actual piece M² of the unnapped blanket fabric of the present invention is illustrated as it appears in an enlarged photograph. In Fig. 18 a similar piece N² of unnapped blanket cloth, woven according to customary practice, similarly enlarged, is shown. In Fig. 17, fabric M³, like that of Fig. 16, is shown as it appears after napping and when viewed against an illuminated background, while in Fig. 19 the fabric like that of Fig. 18, after being napped, is similarly shown at N³. Comparison of Figs. 17 and 18 shows that much more light passes between the wefts of the fabric N³ (Fig. 19) than between the wefts of the fabric M³ (Fig. 17) thus indicating the improved closeness of texture resultant from the practice of the present invention.

Fig. 9 is a photolithograph showing a piece of the new fabric M² to normal scale, as it appears before the napping. In Fig. 10 a similar piece of fabric is shown at M³ as it appears after it has been napped. To illustrate the fact that the napping operation does not substantially affect the initial closeness of the weave, the nap is shown removed from the lower part MX of the piece of fabric M³, and it will be observed that the area MX from which the nap has been sheared still shows a very close texture.

According to the present invention, the weave is a type of twill which can only be woven, it is believed, on a six-harness loom or on a Jacquard. Each filling pick of the yarn 21 (Fig. 2) is associated with a filling pick of the yarn 22 to form a pair, there being six such pairs in a complete pattern repeat according to the embodiment of the invention illustrated in Figs. 4 to 8ᶠ, for example. In the embodiment illustrated by the diagrams of Figs. 4 to 8ᶠ, each complete pattern repeat also comprises twelve warp ends. By the employment of a suitable draft pattern, and by a proper sequence of harness motion, portions of the filling yarn of each pair pass at recurrent intervals from the front to the rear face of the fabric as transversely elongate bights in each of which the yarn appears in the form of a puff which overlaps the other filling yarn of said pair whereby the interstices between successive pairs of filling picks (customarily open and substantially unobstructed [see Figs. 18 and 19] in double weave blanket cloth) are for the most part closed thereby providing a fabric (Figs. 16 and 17) of closer texture warp-wise than usual, without resorting to a triple weave or other expedient which requires a greater amount of material.

The drafting diagram (Fig. 4) shows a complete pattern repeat which comprises twelve warp ends, herein designated by the characters $a$ to $l$ respectively, and twelve picks of filling or wefts here designated by the numerals I to XII respectively, the picks being counted from the bottom of the diagram as is customary.

Inspection of the weave diagram of Fig. 4 shows that for any selected pair of wefts (for example wefts XI and XII), the float at one face of the fabric formed by one weft (for example weft XI), in crossing warps $a$ and $b$, overlaps or is in staggered relation to the float on the same face of the fabric formed by the other weft of the pair (that is, weft XII) in crossing warps $b$ and $c$.

Assuming that the loom employed has six harnesses, which may here be designated as harness numbers 1 to 6 respectively (counting from the reed), the warps will be drawn in as follows: ends $a$ and $d$ in harness number 1; ends $b$ and $e$ in harness number 2; ends $c$ and $f$ in harness number 3; ends $g$ and $j$ in harness number 4; ends $h$ and $k$ in harness number 5; and ends $i$ and $l$ in harness number 6.

The complete pattern repeat R, as indicated in Fig. 4, includes left and right sections A and B, each having the same number of warp ends. The warp ends are divided into groups of three as follows: $a$, $b$, $c$ and $d$, $e$, $f$ in section A, and $g$, $h$, $i$ and $j$, $k$ and $l$ in section B.

The section A comprises two like, sub-repeats of the pattern indicated by the characters R' and R² respectively, while the section B likewise comprises two sub-repeats of the pattern indicated at R³ and R⁴, respectively. However, the sub-repeats of section A differ from the sub-repeats of section B.

Assuming that the warps have been drawn in as above suggested, the harnesses are raised for shedding the warps during weaving in the following order: for picks 1 and 6 harnesses 1, 3 and 4 are up; for picks 2 and 9, harnesses 1, 2 and 5 are up; for picks 3 and 8, harnesses 2, 4 and 5 are up; for picks 4 and 11, harnesses 3, 5 and 6 are up; for picks 5 and 10, harnesses 2, 3 and 6 are up; and for picks 7 and 12, harnesses 1, 4 and 6 are up.

In Figs. 5 to 8ᵇ the actual interlacing of the warps with six pairs of wefts, resultant from the use of the above weave pattern, are shown. As above stated, each section A and B of the diagram of Fig. 4 contains two sub-repeats R and R', R² and R³, respectively. Less than two sub-repeats respectively in each section has been found to produce a fabric such as is shown at M⁴ in Figs. 20 and 21, which is not appreciably different from blanket cloth of customary weave, and wherein the successive picks P of filling are spaced apart approximately as usual; on the other hand, if more than three sub-repeats in each section are employed, there develops a tendency to produce longitudinal stripe effects. For example, a cloth such as is illustrated at M⁵ in Fig. 22, which comprises six sub-repeats in each complete repeat, exhibits distinct longitudinal stripes consisting of closely spaced transverse floats with intervening longitudinally extending areas of loose texture. When napped, this cloth lacks uniformity in color and texture.

Two sub-repeats, only, in each section are preferred. A cloth made with but two sub-repeats in each section has a surface texture which is entirely devoid of longitudinal stripes, with the result that the blanket, when napped, is of the desired uniform shade and texture.

Figure 5:
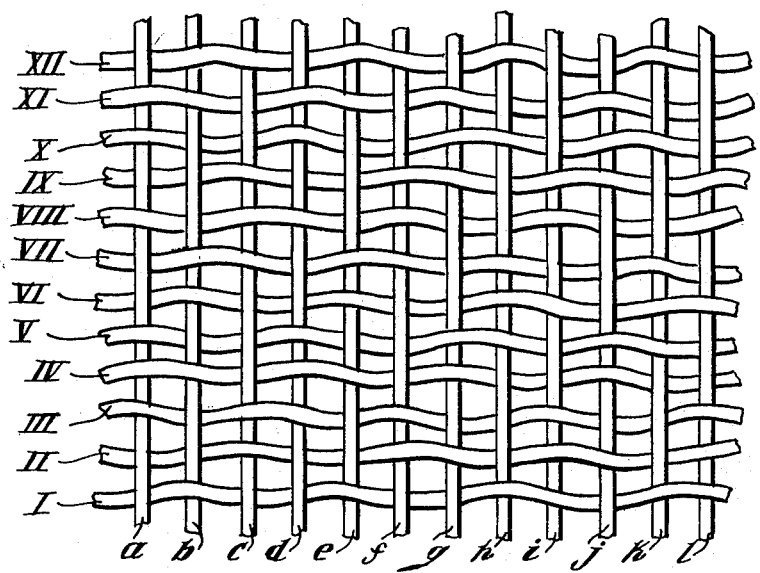
Fig. 5 is a chart showing the filling interlacing.
Figure 6A:
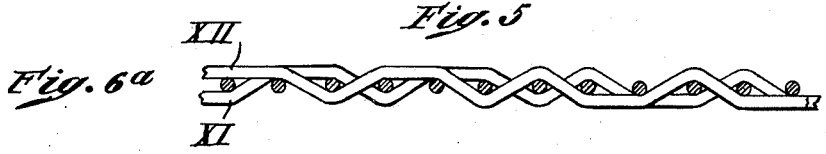
Figure 6B:
Figure 6C:
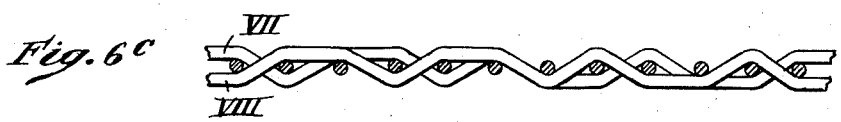
Figure 6D:
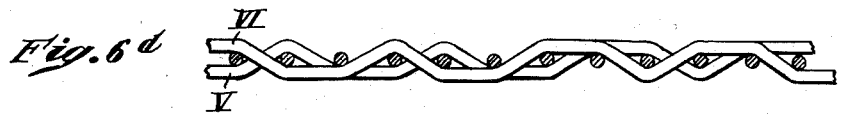
Figure 6E:
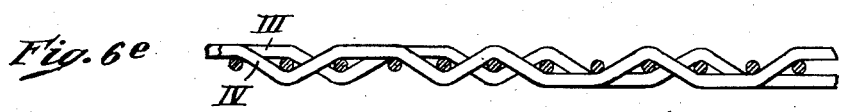
Figure 6F:
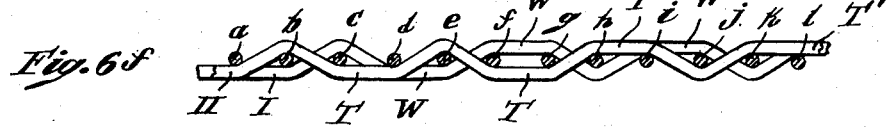

Inspection of Figs. 5 to 6ᶠ shows that each weft of a pair, for instance weft II (Fig. 6ᶠ) comprises elongate bights or floats T at each side of the fabric and, similarly, bights or floats T' at the opposite face of the fabric, with its companion weft I also having bights or floats W and W' at opposite faces of the fabric. Furthermore, while in some instances a float T of one weft may be directly opposite a float W' of the other weft, in other instances the floats of the respective wefts at opposite faces of the fabric are displaced transversely of the fabric relatively to each other.

Just why the unique results above described flow from the practice of the invention as hereinabove described and illustrated is not known, but it appears that because of the change in the pattern, between sections A and B, the filling yarns are displaced and so bound in by the warps as to cause the filling yarns to bulge and crowd each other in the manner previously described, with the resultant production of the puffs appearing recurrently at opposite sides of the fabric.

As may be noted from inspection of Figs. 16 and 29, the puffs which result from the rolling of one weft of a pair over the other weft appear, in the majority of instances, to be unsymmetrical, being more or less arcuate in contour, thus imparting to the surface of woven cloth, before it is napped, a distinctive crinkled effect.

As above noted, the material M illustrated in Figs. 2 and 3 is designed merely to illustrate the theoretical arrangement of the yarns resultant from the employment of the suggested weave pattern. The material M would not be useful for making a blanket, not only because the braided cords used as wefts could not be napped to any substantial extent, but because these cords are excessively large as compared with usual blanket cloth yarns, so that the fabric is very tightly woven and is stiff and boardy. In the suggested example of a practical blanket cloth above given, wherein the warps are arranged in a 33 sley and the wefts are of number 2½ cotton count, there would be approximately the same number of picks of weft per inch as warps per inch in a cloth of a conventional weight for use in blanket manufacture. As shown in Fig. 2, the puffs P, $P^2$ etc. of the fabric M occur at very regular intervals, and in fact produce a pattern effect, but this is not true of the actual blanket cloth made in accordance with the present invention and which is shown magnified in Fig. 16. Although the actual unnapped blanket cloth $M^2$, when viewed in certain lights, as illustrated in Fig. 9 for example, exhibits a certain twill effect, when enlarged, as shown in Fig. 16, this effect substantially disappears, and the material has no distinct pattern, the puffs or floats P, P' etc. being soft and irregular and being distributed over the surface without any appearance of definite order. Thus, when the fabric is napped the nap is uniform in appearance and in depth, and shows no suggestion of stripes or other variation from uniformity.

As hereinabove described, a single complete repeat of the fabric, in a preferred embodiment of the invention, includes twelve warps and twelve wefts, but useful results have been obtained by the use of only six picks of filling in a complete pattern repeat. Such an arrangement is illustrated for example, in Figs. 23 to 30 inclusive, Fig. 23 being a weave diagram of such a fabric.

Fig. 23 shows a complete pattern repeat R which includes right and left sections A and B respectively, the section A comprising two like, sub-repeats of the pattern indicated at R' and $R^2$ respectively, while the section B comprises two like repeats $R^3$ and $R^4$. However, the sub-repeats in the section A differ from those in section B, as in the weave diagram of Fig. 4.

As in the weave diagram of Fig. 4, the letters $a$, $b$, $c$, $d$, $e$, $f$, $g$, $h$, $i$, $j$, $k$ and $l$ indicate the twelve warps of a complete pattern repeat, but in this construction only six picks of filling are included in a complete pattern repeat, these being indicated by the numerals I, II, III, IV, V and VI respectively. In this instance, there will be but three pairs of picks in a complete pattern repeat.

Assuming that the loom has six harnesses as before suggested, the warps will be drawn in the same way as previously described.

In weaving, the harnesses are raised for shedding the warps in the following order: for pick I, harnesses 1, 2 and 5 are raised; for pick II harnesses 3, 5 and 6 are raised; for pick III harnesses 1, 3 and 4 are raised; for pick IV harnesses 2, 4 and 5 are raised; for pick V harnesses 2, 3 and 6 are raised; and for pick VI harnesses 1, 4 and 6 are raised.

Fabric $M^6$, woven as just above described, is illustrated in Fig. 29, the characteristic floats or puffs above described being clearly indicated and being distributed substantially uniformly over the surface of the material, in this case giving it a somewhat wavy appearance. This fabric, before being napped and much magnified, is illustrated in Fig. 28, wherein the puffs or floats $P^6$ are shown to large scale. It will be noted that this fabric is not quite so dense as that wherein twelve picks of filling are used in each complete pattern repeat (compare Fig. 28 with the upper part of Fig. 11), but the napped fabric (illustrated at $M^7$ in Fig. 30) retains its nap much better than does the conventional blanket and provides greater warmth in the same weight blanket; and it effectively resists shrinkage during laundering in substantially the same way as a blanket made as above described, wherein there are twelve picks of filling for each pattern repeat.

Comparison of the weaving diagrams of Figs. 4 and 23 shows that it is characteristic of the new weave structure that each pick of weft forms at least one float in one or the other of the sections A or B of the complete pattern repeat, but that no pick ever forms floats, at the same side of the fabric, wholly within both sections of the complete repeat, although one or more picks may form floats, at the same side of the fabric, partly in one section and partly in the other.

While certain desirable methods of procedure have herein been described, and while the surface appearance and weave structure of fabrics resultant from the practice of this process have herein been suggested, it is to be understood that the invention is broadly inclusive of any and all modifications, both of the method and/or of the fabric which fall within the scope of the appended claims.

I claim:

1. That method of weaving, on a six harness loom, double-weave blanket cloth which, when subjected to the first standard laundry treatment, does not shrink more than approximately 4% of its original length and which is of the same appearance and texture at both faces and wholly devoid of stripe effects, said method comprising as steps drawing in the warps according to a pattern comprising two adjacent sections which collectively constitute a complete pattern repeat wherein each of said sections consists of but two sub-repeats of the pattern, each sub-repeat providing for three warp ends and twelve picks of filling, sub-repeats of each respective section being alike, but the sub-repeats of one section being different from those of the other section, warps 1, 2 and 3 corresponding to each sub-repeat of the first section being drawn in to harnesses 1, 2 and 3 respectively of the loom, and warps 1, 2 and 3 corresponding to each sub-repeat of the second section of the pattern being drawn into the fourth, fifth and sixth harnesses respectively of the loom thereby providing a complete warp repeat of the intended pattern, and, while picking twelve wefts to form a complete weft repeat of the pattern, shedding the harnesses according to the following sequence: for picks 1 and 6, harnesses 1, 3 and 4 up; for picks 2 and 9, harnesses 1, 2 and 5 up; for picks 3 and 8, harnesses 2, 4 and 5 up; for picks 4 and 11, harnesses 3, 5 and 6 up; for picks 5 and 10, harnesses 2, 3 and 6 up; and for picks 7 and 12, harnesses 1, 4 and 6 up.

2. That method of weaving double weave blanket cloth which, when subjected to the first standard laundry treatment does not shrink more than approximately 4% of its original length and which is of the same appearance and texture at both faces, said method comprising interweaving warps of the order of 21.75 singles, cotton yarn in a 33 sley and filling yarns of mixed staple-rayon and nylon of from 1½ to 2 inch staple, with from 22 to 35 picks per inch, by shedding the warps, counting from one side of the loom, in accordance with the following sequence:— preparatory to picking the first and sixth wefts, raising warps 1, 3 and 4; preparatory to picking the second and ninth wefts, raising warps 1, 2 and 5; preparatory to picking the third and eighth wefts, raising warps 2, 4 and 5; preparatory to picking the fourth and eleventh wefts, raising warps 3, 5 and 6; preparatory to picking the fifth and tenth wefts, raising warps 2, 3 and 6; and, preparatory to picking the seventh and twelfth wefts, raising warps 1, 4 and 6.

3. That method of weaving double-weave blanket cloth having substantially the same surface appearance and texture on both sides and throughout the entire area which comprises shedding relatively fine warp yarns according to a draft pattern comprising two independent sections which collectively constitute a complete pattern repeat, each of said sections consisting of but two sub-repeats, each sub-repeat comprising three warp ends, the sub-repeats of each section being alike, but the sub-repeats of the two sections being unlike, and interweaving pairs of picks with the warp ends in such a way that the picks of a pair form elongate floats, each crossing two warp ends but not more than two warp ends and so that the picks of said pair roll relatively to each other whereby floats of each pick of said pair appear sometimes at one side of the fabric and sometimes at the other side of the fabric and with floats, of one weft of said pair, which appear at one side of the fabric overlapping floats, formed by the other weft of said pair, at the same side of the fabric.

4. A twill double weave blanket cloth which, when subjected to its first standard laundry treatment does not shrink more than approximately 4% of its initial length, said cloth comprising relatively fine hard twisted warps interwoven with relatively coarse, soft, twisted wefts, the wefts being disposed in pairs and so interwoven with the warps that at any longitudinal section through the fabric the centers of the two wefts of any selected pair are disposed in a plane inclined to the face of the cloth, each weft of a pair exhibiting, at each face of the cloth, recurrent portions which are relatively thick warp-wise of the fabric, appearing as transversely elongate puffs, and intervening relatively narrow portions, the wider portions or puffs of each weft of a pair appearing first at one face and then at the other of the cloth, a puff formed by one weft of a pair which appears at one face of the fabric overlapping a puff formed by the other weft of the same pair at the same face of the fabric.

5. A twill double weave blanket cloth which, when subjected to a conventional napping operation does not lose more than approximately 5% of its original weight, said cloth comprising relatively fine hard twisted warps interwoven with relatively coarse soft twisted wefts, the wefts being disposed in pairs, the weave structure being such that at any longitudinal section through the fabric, the centers of the two wefts which constitute any given pair are disposed in a plane which is inclined to the face of the fabric, each weft having recurrent portions which are relatively thick warpwise of the cloth and intervening relatively thin portions, the thick portions of one weft of a pair registering with thin portions of the other weft of said pair, and vice versa, each pick of a weft forming at least one float in one or the other of the two sections of the complete pattern but never forming a complete float at the same face of the fabric in both sections of the complete pattern repeat.

6. A twill double weave blanket cloth comprising relatively fine warps and relatively coarse wefts interwoven according to a pattern wherein each full repeat comprises twelve warp ends and includes two adjacent sections, each of which comprises at least two and not more than three sub-repeats, the sub-repeats of each section being alike but differing from those of the other section, the wefts being in pairs and the picks of any selected pair of wefts being so associated with the warps that each weft of a pair forms recurrent elongate floats, floats of each respective weft of a pair appearing sometimes at one face and sometimes at the opposite face of the fabric, and at regularly recurrent intervals having floats of one weft of a pair, which appear at a given face of the fabric, overlapping floats formed by the other weft of the same pair at the same face of the fabric.

7. Blanket cloth according to claim 6, wherein each repeat of the pattern contains six picks of weft.

8. A twill, double weave blanket cloth having substantially the same surface texture and appearance on both sides and throughout its entire area, and wherein warps and wefts are disposed in crossing relation according to a weave pattern, each complete repeat of the weave pattern containing six pairs of picks of weft and each complete pattern repeat comprising two adjacent sections, each consisting of two like sub-repeats, each sub-repeat containing the same number of warp ends, the sub-repeats which constitute each respective section of the complete pattern repeat being alike but being different from the sub-repeats of the other section of the complete pattern repeat, the two wefts of any selected pair forming elongate floats, the picks of a pair being rolled relatively to each other so that floats of a pick of each pair appear sometimes at one side and sometimes at the opposite side of the fabric, a float formed by one weft of a pair which appears at one face of the fabric overlapping a float formed by the other weft of the same pair at the same face of the fabric.

9. A twill, double weave blanket cloth, according to claim 8, wherein twelve warps and twelve ends of weft constitute a complete pattern repeat.

10. A blanket comprising twill, double weave blanket cloth, napped on both sides, the cloth comprising relatively fine, hard, twisted warps interwoven with relatively coarse, soft, twisted wefts, the wefts being disposed in pairs, the center points of the wefts of any selected pair, at any selected longitudinal section of the fabric, being disposed in a plane inclined to the face of the cloth, the opposite faces of the cloth, prior to napping, being substantially alike in texture and appearance throughout its entire area, each face exhibiting transversely elongate recurrent puffs formed by one weft of a pair with intervening relatively thin portions, the other weft of the same pair having similar puffs and relatively thin portions exposed at the opposite face of the fabric, each weft of a pair forming puffs on both faces of the fabric, the major portion of the nap consisting of fibers raised from the puffs, the staple length of the fibers comprised in the wefts exceeding the lengths of the puffs whereby the nap of each face comprises fibers originating in wefts which are predominantly at the opposite face of the fabric, a puff formed by one weft of a pair which appears at a given face of the fabric overlapping a puff formed by the other weft of the same pair at the same face of the fabric.

11. A twill, double weave, blanket cloth whose opposite faces have substantially the same color and texture throughout its entire area and comprising six pairs of picks of weft and twelve warp ends in each complete pattern repeat, the wefts which constitute each successive pair of picks crossing periodically from one face to the other of the fabric, each weft being undulant warp-wise of the fabric, the convexities formed by said undulations appearing, prior to the napping, as recurrent puffs at opposite faces of the fabric with relatively narrow portions connecting said puffs, the puffs of one weft of a pair at one face of the fabric overlapping puffs of the other weft of said pair at the same face of the fabric, each of said puffs being crossed by a plurality of warps, the warps being of the order of 21.75 singles, cotton yarn and the weft being a mixed staple rayon and nylon of from 1½ to 3 inches staple length, with from 22 to 35 picks of weft per inch.

References Cited in the file of this patent

UNITED STATES PATENTS

| | | |
|---|---|---|
| 2,246,749 | Moeckel | June 24, 1941 |
| 2,686,538 | Nelson | Aug. 17, 1954 |
| 2,740,434 | Lemieux | Apr. 3, 1956 |

FOREIGN PATENTS

| | | |
|---|---|---|
| 241,764 | Great Britain | May 13, 1926 |
| 466,750 | Great Britain | May 31, 1937 |